April 5, 1938.  L. CAUTE  2,113,504
ENDLESS CHAIN
Filed Dec. 8, 1936
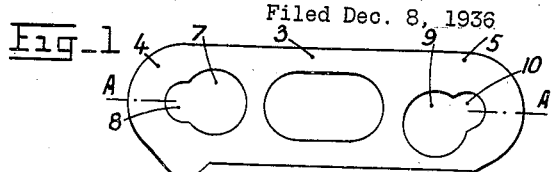
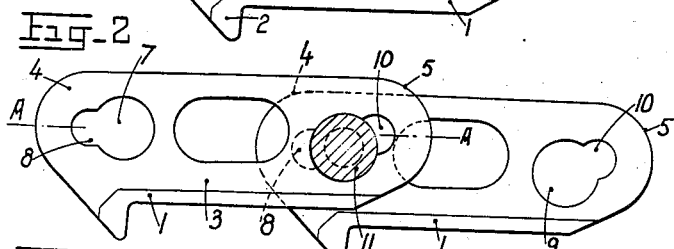
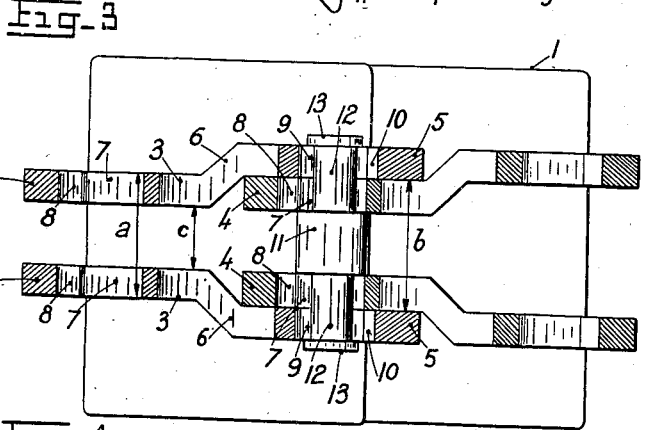
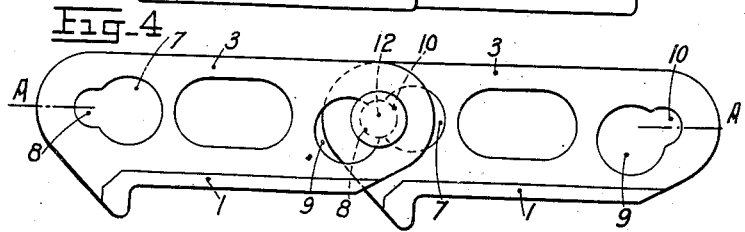
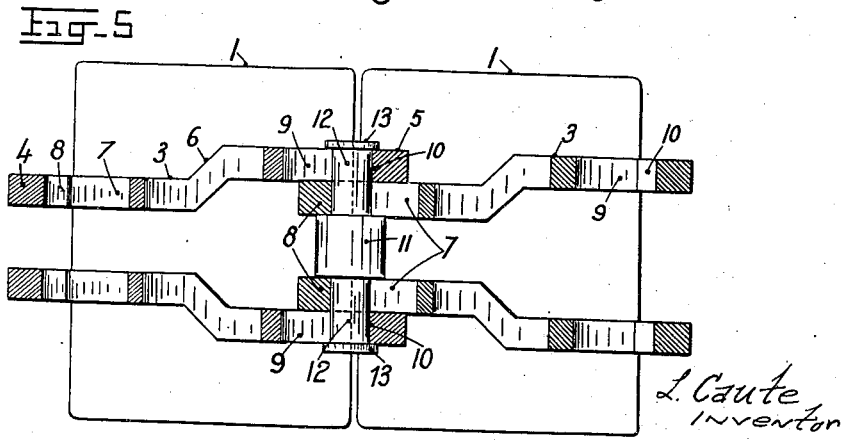
L. Caute
Inventor
By Glascock Downing & Seebold
Attys Patented Apr. 5, 1938

2,113,504

UNITED STATES PATENT OFFICE 2,113,504

ENDLESS CHAIN

Louis Caute, Ezanville, France, assignor to Société dite: Société de Construction du Tracteur Vigneron Georges Vidal, Société Anonyme, Montpellier, France, a corporation of France Application December 8, 1936, Serial No. 114,834
In France December 11, 1935

3 Claims. (Cl. 305—10)

The present invention relates to an improved method for assembling the links of endless chains, which can be employed for the assembling of the shoes of crawlers for the treads of agricultural tractors or the like, for the chains of conveyors and elevators, and in general, for all forms of chains adapted for various uses.

By this improved method of assembling, the chain links can be connected together without the use of pins or nuts which serve to prevent the connecting axles from leaving their recesses, while at the same time affording all security for the resulting assemblage, the device being simple and rapidly mounted.

The chain link essentially consists of two cheeks or lugs having the parallel position, each consisting of two parts with different spacing, which are connected together. The narrower part, which will be termed, for the convenience of the description, the "male part", is adapted for a ready insertion into the wider part or "female part" of the preceding link.

In each of the lugs or cheeks constituting the male and female parts are formed apertures of a stated diameter, which are extended according to a radius by a narrower part of semicircular shape.

The assembling axle which connects the said links together consists of a cylindrical part whose diameter corresponds to that of the apertures of the lugs and whose length is equal to the distance between the inner faces of the male part. This central part of large diameter is extended, at each end, by a part having a smaller diameter, whose radius corresponds to that of the said semicircular notches which extend the apertures of large diameter formed in each link. The length of these narrow parts which extend respectively to the right and the left of the cylindrical part of large diameter, is equal to twice the thickness of each lug. Each of the said narrow parts has at its end an enlarged head which serves to hold the said links together and to prevent all spreading of the same under the action of lateral stresses which may be produced.

For the proper understanding of the invention, it will be particularly described with reference to the accompanying drawing, which represents the application of the present method of assembling to chain links supporting the crawler shoes for agricultural tractors.

Fig. 1 is an elevational view of the chain link.

Fig. 2 is a like view showing the method of assembling two links, in the position corresponding to the engagement of the maintaining axle.

Fig. 3 is a corresponding plan view.

Fig. 4 is an elevational view showing two links which are assembled and held together.

Fig. 5 is a corresponding plan view.

Referring to the link represented in Fig. 1, it will be observed that the shoe properly so called, which is to make contact with the ground, is shown at 1, and it has, in plan view, a rectangular form (Fig. 3) ending in a curved part 2 by which it will sink into the ground. Two lugs 3 (Fig. 3) situated on either side of the axis of the shoe 1, are cast in one with the shoe. The said lugs cover the whole width of the shoe, and extend outwardly of the same at the front and rear, to a slight extent. Each lug 3 consists of two parts, which will be termed, for the convenience of the description, the male part 4 and the female part 5, and the spacing between the two is such that the distance $a$ between the outer faces of the male parts shall be equal to the distance $b$ between the inner faces of the female parts 5.

The male parts 4 and the female parts 5 of the lugs 3 are connected together by inclined portions 6.

In the said male and female parts are formed apertures 7 of a stated diameter, which are extended to the left by a restricted part or notch 8 of semicircular form, whose diameter is equal to the radius of the aperture 7. The said aperture and notch are situated on the horizontal axis A—A of the link.

In the female part 5 of the lugs 3 are also formed apertures 9 whose diameter is the same as that of the aperture 7 and are extended to the right by notches 10 having the same shape and diameter as the notches 8. However, the center of the semicircular notch 10 is located on the axis A—A of the link, whilst the center of the aperture 9 is situated somewhat below this axis, in order to facilitate the assembling of the links.

The axle upon which the said links are assembled consists essentially of a cylindrical part 11 whose diameter is practically equal—with a certain clearance—to the diameter of the apertures 7 and 9, and whose length is equal to the distance $c$ between the inner faces of the male parts 4. The cylindrical part 11 is extended, at either end, by narrower cylindrical parts 12, whose diameter is exactly the same as that of the notches 8 and 10 and whose length is equal to twice the thickness of the lugs 3. At the ends of the parts 12 are heads 13 of larger diameter which serve to maintain the said axle in the lugs of the assembled links, and are in contact with the outer faces of the female part.

The method of assembling is as follows.

Taking two links, these are placed in line in such way that the male part 4 of one link can fit into the female part 5 of the preceding link. The insertion of the male part into the adjacent female part is effected in such manner that the apertures 7 of the male part will be exactly in coincidence with the apertures 9 of the female part of the preceding link. Owing to the eccentric position of the apertures 7 and 9, the links will take the position shown in Fig. 2, and the link whose male part is engaged in the female part of the preceding link will differ somewhat in height from the latter. At this time, as the apertures 7 and 9 of the lugs 3 are in coincidence, the assembling axle is inserted through the male and female parts of the lugs, in such way that its enlarged part 11 will be located exactly between the inner faces of the male part 4.

As shown in Fig. 3, the narrow parts 12 situated at either end of the part 11 of the axle, pass through the male and female parts of the lugs 3, and their enlarged heads 13 come outside of the external faces of the female part 5. At this time, in order to assemble the two links, it is simply necessary to draw upon both links in such way that the narrow parts 12 of the axle will come into the notches 10 of the female part 5, and that on the other hand they will be maintained therein by the notches 8 of the male part 4, which make contact with the said narrow parts. Thus each lug 3 of the male and female parts will be held between the head 13 and the large cylindrical part 11, and these will bear respectively upon the outer faces of the female part and upon the inner faces of the male part.

The device thus assembled is shown in Figs. 4 and 5.

The links are thus held together by the heads 13 which extend upon the female parts 5 and prevent them from spreading apart under any lateral stresses coming upon the links.

During the traction exerted upon the links for the assembling, the male part engaged in the female part has been somewhat displaced in height in order that the narrow parts 12 may enter the notches 10, and in such way that the assembling axis will be located exactly on the axis A—A of the links.

This method of connecting the chain links can be applied to all chains, whatever be their use, such as chains for transmission, chains for transporting materials, chains for elevators, chain pumps, and the like.

I claim:

1. An endless chain comprising a succession of links, each link having a shoe part and lugs provided with openings extending inwardly from the end portions of the lugs and having the inner extremities thereof enlarged, a bolt having a head adapted to be passed through the enlarged ends of said holes, the enlarged ends of said holes being disposed at different distances from said shoe part whereby the enlarged holes at the adjacent ends of two adjoining links are aligned with each other for the insertion of said bolt, only when said links are relatively displaced out of their normal position in the chain.

2. An endless chain comprising a succession of similar links, each link including a shoe part and a lug carried by said shoe part, a headed bolt for connecting adjacent links, said lug having openings adjacent the opposite extremities thereof and restricted extensions communicating with said openings, the openings at the opposite ends of the lug being disposed at different distances from the shoe part whereby the openings in the adjacent ends of two adjoining links are disposed in alinement with each other for the insertion of the headed bolt only when said links are moved out of normal general formation.

3. A chain as claimed in claim 2 characterized in that said extensions are disposed in angular relation to each other.

LOUIS CAUTE.